Jan 6, 1931.  W. D. FLETCHER  1,787,930
APPARATUS FOR GENERATING ELECTRIC ENERGY
Filed April 20, 1929
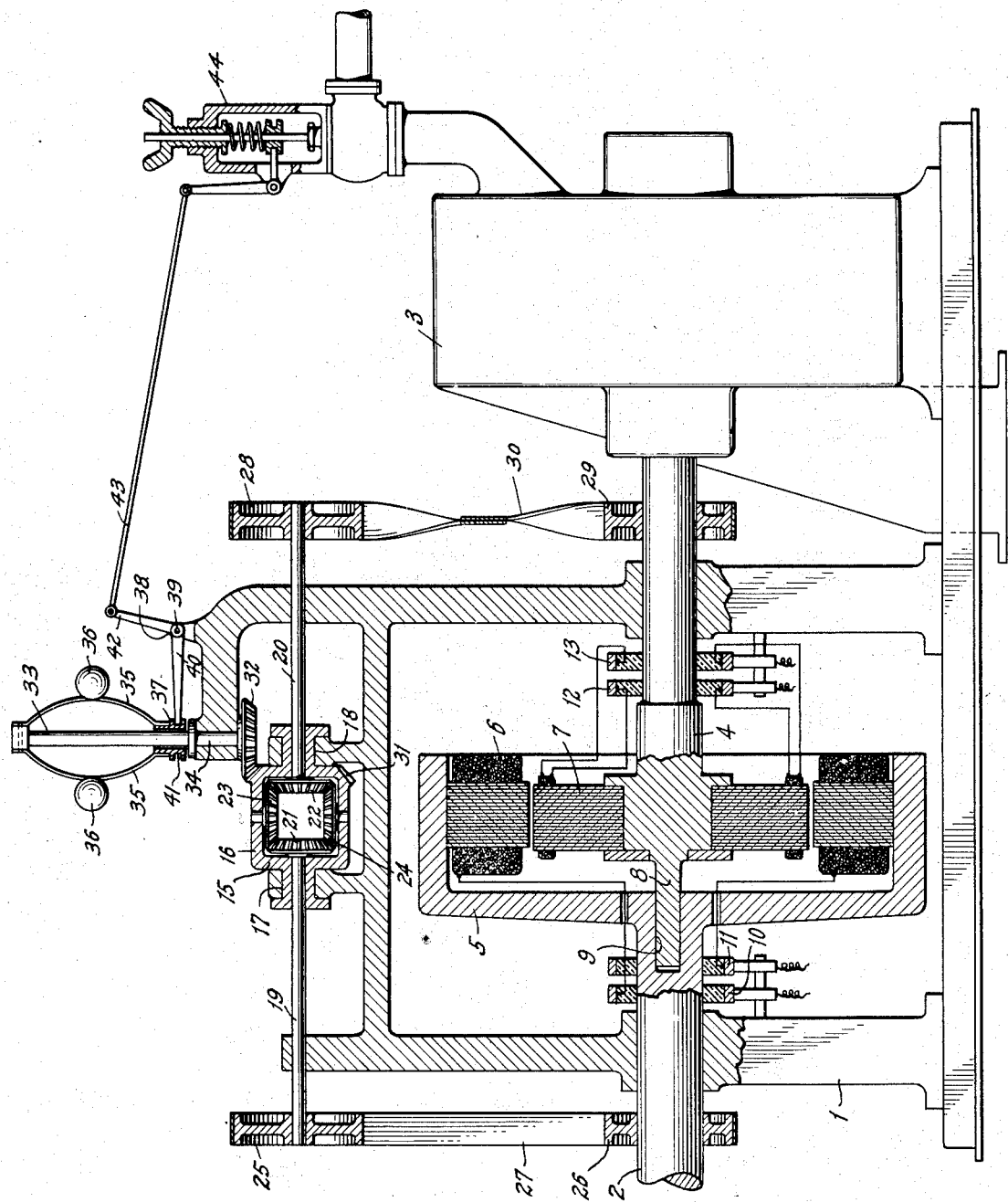
INVENTOR
*William D. Fletcher*
BY
*George C. Shoul*
ATTORNEY Patented Jan. 6, 1931

1,787,930

UNITED STATES PATENT OFFICE

WILLIAM D. FLETCHER, OF WEST BRIGHTON, NEW YORK

APPARATUS FOR GENERATING ELECTRIC ENERGY

Application filed April 20, 1929. Serial No. 356,721.

This invention relates to a system for the generation of auxiliary electric power from a main prime mover operating at variable speeds.

It is an object of this invention to provide a system in accordance with which such power may be generated from the main prime mover efficiently and economically but in accordance with which any changes in speed of the main prime mover are automatically compensated for.

In many installations, such for example, as on board a ship, generators are provided for the generation of the current required upon the ship. It is desirable to operate these generators from the main prime mover of the ship, as for example by connecting them direct to the main propeller shaft. Such shaft, however, may at different times operate at widely varying speeds and at times may be reversed in direction.

It is an object of this invention to insure that the generator shall be operated at all times at its predetermined speed regardless of the speed or direction of the rotation of the main shaft. To accomplish this result there is provided an auxiliary prime mover in addition to the main prime mover and the two prime movers are differentially connected to the generator in such a manner that any change in speed of the main prime mover may be compensated for by a change in speed of the auxiliary prime mover. This may conveniently be accomplished by rotating the armature of the generator by one of the prime movers and the field by the other. This embodiment of the invention has therefore been chosen for illustration.

The figure is an elevation, partly in section, of a machine embodying the invention in which the numeral 1 designates a frame having journalled therein a shaft 2 which may be connected to the main prime mover. An auxiliary prime mover indcated at 3 has its shaft 4 also journalled in the frame 1 in alinement with the shaft 2.

A generator indicated generally at 5 has two elements 6 and 7 comprising respectively a field and armature. One of these elements, as for example the field element 6, is mounted upon and arranged for rotation with the shaft 2 while the other element as for example the armature element 7, is mounted upon and arranged for rotation with the shaft 4 within the field. The armature element 7 may be provided with a stub shaft 8 extending along its axis to be received in a journal 9 within the field element 6 to maintain the alinement of the parts.

The generator chosen for illustration is of the alternating current type, the current being conducted to the field magnets through suitable slip rings 10 and 11 and the current being withdrawn from the armature through slip rings 12 and 13.

With this construction it will be clear that the current generated will depend upon the difference in speed of the two prime movers. Automatic means are provided for maintaining this difference constant by alteration of the speed of the shaft 4. To accomplish this result there is mounted upon the frame 1 a differential indicated generally at 15 which may assume the form of a housing 16 journaled at 17 and 18 upon the frame 1. A pair of shafts 19 and 20 are journalled in the housing concentric with the journals 17 and 18 and carry at their inner ends within the housing, bevel gears 21 and 22 which mesh in turn with bevel gears 23 and 24 journalled in the housing 16 on an axis at right angles to the shafts 19 and 20. The shaft 19 carries a pulley 25 which is driven from a pulley 26 upon the shaft 2 by means of a belt 27. The corresponding shaft 20 carries also a pulley 28 which is driven from a pulley 29 upon the shaft 4 by means of a belt 30. One of the belts, as for example the belt 30, is crossed.

The housing 16 carries a bevel gear 31 meshing with a bevel gear 32 upon a governor shaft 33 journalled in the frame 1 as shown at 34. This shaft drives a pair of spring arms 35 each carrying a weight 36, the arms being rigidly held at their upper ends and being connected at their lower ends to a block 37 slidable upon the shaft 33. A bell crank lever 38 pivoted at 39 to the frame 1 has one of its arms 40 engaging a slot 41 in the block 37. The other arm 42 of the bell crank lever operates a rod 43 to operate a valve 44 to control the flow of motive fluid to the prime mover 3.

With the above construction it will be clear that the housing 16 will rotate at a speed which is one half of the sum of the speeds of rotation of the shafts 19 and 20 and this by reason of the crossed belt 30 corresponds to the difference in the speed of rotation of the shafts 2 and 4.

The apparatus may be arranged so that the shaft 4 normally rotates either in the same direction or in the opposite direction to the shaft 2 when the shaft 2 is going at its full forward speed but it is simpler to arrange it so that either it does not rotate or it rotates in the opposite direction to the shaft 2 when the latter is going full speed forward because with this arrangement all changes in the speed of rotation or direction of the shaft 2 may be compensated for by changes in the speed of the shaft 4 without changing its direction of rotation.

The governor 36 will be arranged so that normally, when the propeller shaft 2 is being driven forward at customary full speed, the valve 44 will admit steam to the secondary prime mover 3 sufficient to hold the rotor of the latter stationary against the torque of the field 6 which is carried by said propeller shaft. But little steam is required to do this since its torque on the stationary turbine rotor is three or four times the torque that is developed when the rotor is rotating at normal speed. As soon as the speed of shaft 2 begins to fall off, the governor begins to further open the steam inlet so as to maintain the desired constant differential speed between the field and the armature. Should the main prime mover stop altogether, the full burden of generation will be taken up by the auxiliary prime mover 3, which will now have correspondingly increased its speed. Should the main shaft be reversed a still further quantity of motive fluid will be admitted to the prime mover 3 and a still higher speed will be required of the shaft 4 but in each instance the relative speed of the generator parts and consequently the voltage of the generator will be maintained constant.

With the above construction, it will be clear that during normal operation of the main prime mover while it is moving at full speed, it will furnish the power required for the current generation and the advantages of its high efficiency will be secured. At the same time, all speed changes of the main prime mover are fully compensated for in a practical and efficient manner.

In certain applications of the invention, it may be desirable to design the control so that while shaft 2 is rotating at its normal rate and in its normal direction of rotation, the secondary prime mover 3 may be either stationary, revolving in the same direction as shaft 2, at a greater rate of speed, or at a lesser rate of speed; or prime mover 3 may be rotating in one direction and shaft 2 in the opposite direction.

It is understood that the governor 36 and valve 44 are merely diagrammatic, that any desired form of governor may be used and that in actual practice for control of speed of a turbine the valve element would ordinarily operate to cut in and out a greater or less number of steam nozzles operating on the turbine rather than to increase the amount of steam discharged through a single nozzle. In certain cases, the current output of the generator may be used to control the speed of the secondary prime mover 3. In any case, a voltage regulator may be employed to keep up the voltage by increasing the field magnetizing current through a certain range of varying speed of the propeller shaft 2 and when that range is exceeded, a relay mechanism will operate to co-relatively speed up the secondary prime mover 3. In all cases, the voltage regulator will operate to smooth out imperfections in the governing for the desired constant differential speed of the prime movers.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. In an apparatus for generating auxiliary electric power from a main prime mover, in combination a secondary prime mover, a generator having two rotating elements one of which carries the field and one the armature, each said elements being connected to one of said prime movers, a differential responsive to the difference in speed of said elements, and a governor operated by said differential to control the power input to said secondary prime mover to maintain a constant difference in speed between said elements.

2. In an apparatus for generating auxiliary electric power from a main prime mover, in combination a secondary prime mover, a generator having two rotating elements one of which carries the field and one the armature, each said elements being connected to one of said prime movers, a differential responsive to the difference in speed of said elements, and a governor operated by said differential to control the effect of said secondary prime mover upon the rotating element connected thereto, to maintain a constant difference in speed between said elements.

3. In an apparatus for generating auxiliary electric power from a main prime mover, in combination a secondary prime mover, a generator having two rotating elements one of which carries the field and one the armature, each said elements being connected to one of said prime movers, a differential responsive to the difference in speed of said elements, and a governor operated by said differential to increase the power input to said secondary prime mover with each decrease in speed of the main prime mover.

Signed at New York in the county of New York and State of New York this 16th day of April A. D. 1929.

WILLIAM D. FLETCHER.